April 1, 1952  S. E. GARUTSO  2,591,535

BALANCED OPTICAL OBJECTIVE AND FOCUSING LENS ASSEMBLY

Filed Aug. 28, 1946

Stephen E. Garutso
INVENTOR.

BY William R. Ballard
ATTORNEY

Patented Apr. 1, 1952

2,591,535

UNITED STATES PATENT OFFICE 2,591,535

BALANCED OPTICAL OBJECTIVE AND FOCUSING LENS ASSEMBLY

Stephen E. Garutso, San Fernando, Calif., assignor, by mesne assignments, to Balanscope, Inc., a corporation of California Application August 28, 1946, Serial No. 693,460

8 Claims. (Cl. 88—57)

This invention relates to lenses for use in cameras or wherever depth of focus and fidelity of image are important, and its object is to improve these qualities in lenses used for such purposes. The invention constitutes an improvement on the type of lens disclosed in my earlier applications, Serial No. 581,382 filed March 7, 1945, now abandoned, and Serial No. 624,501 filed October 25, 1945, now Patent No. 2,550,685, dated May 1, 1951.

I have discovered that an improvement in focus depth and fidelity can be obtained by using annular balancing lens elements overlying a conventional lens in the region between the central area and the peripheral area.

Figure 1:
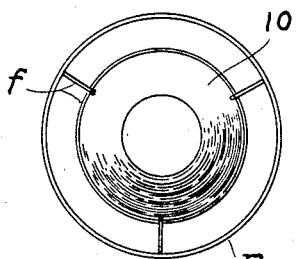
Figure 1 shows a front view of a balancing element and means for supporting it in position.

In Figure 1 an annular balancing element 10 is shown supported concentrically within the mounting F by a fine wire frame $f$ comprising a ring skirting the outer edge of the annulus and three struts holding it in position in the mounting F.

Figure 2:
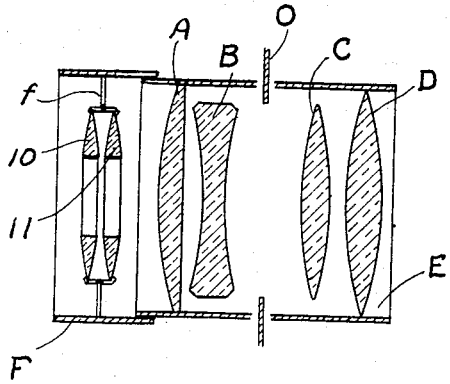
Figure 2 is a medial sectional view of a complete lens including balancing elements such as shown in Figure 1.

Figure 2 shows a plurality of such annular elements, 10 and 11, supported in plane concentrically by the wire frame $f$ in front of the elements A, B, C and D of a conventional lens, the mounting of which is indicated at E and the diaphragm at O. The annular elements may if preferred be located behind the conventional lens elements, or may be placed within its structure as for example between the elements B and C. If placed between the elements of the conventional lens the annular elements will preferably have a somewhat smaller inside and outside diameter since the cone of transmitted rays at that point is of smaller diameter.

Instead of supporting the balancing elements 10 and 11 in the manner shown in Figures 1 and 2 they may be supported in any other convenient way as, for example, by attaching them with optical cement to an optically flat plate of glass or like material which closely fits the mounting E or F.

Figure 3:
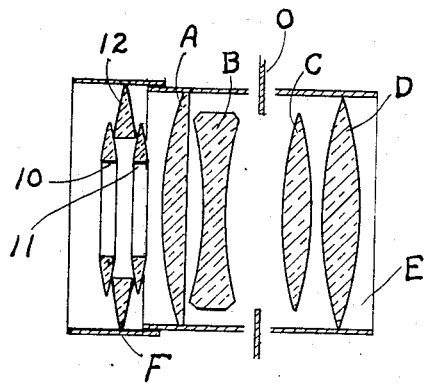
Figure 3 is a medial sectional view of another form of the invention.

In Figure 3 the balancing elements are shown as supported in place in the mount F by attaching them with optical cement to another balancing element 12 of the type disclosed in the earlier applications above referred to, which is of a size to be held firmly by the mount. In this construction the balancing elements of both type contribute to increased depth of focus obtained.

The total refractive power of the several balancing elements used in any given case will depend on the depth of focus required and the characteristics of the conventional lens used, and the total refractive power may be divided between two or more annular elements in any convenient manner. The balancing elements corresponding to the elements 10 and 11 in the examples above given, whatever their number and wherever located, will be so proportioned to the size of the conventional lens as to overlie its elements in a zone intermediate their central part and their peripheral area, and the best results as respects depth of focus and equality of brilliance in the objects focused will be had if the area of the annulus as viewed from the front is of the same order of magnitude as the area of the conventional lens not covered by the annulus.

As is explained in my above-mentioned prior application Serial No. 624,501, filed October 25, 1945, and now issued as Patent No. 2,550,685, and as is apparent from the foregoing, the refractive power or focal length of the annular lens or lenses constituting the balancing assembly is so selected as to focus sharply, the image of a near object to be photographed on the same plane as contains the sharply focused image of far objects produced by the unaffected portion of the conventional lens. In other words, a conjugate focus relationship obtains between the just mentioned common focal plane and the near object to be photographed as to such light passing therebetween which passes through both said balancing assembly and said conventional lens. In short, the result of the arrangement just described is to focus both near and far objects on the common plane.

A conventional lens combined with balancing elements as above described will have a greatly increased depth of focus over that possible with the conventional lens along, and in the image the distortion in size as between near and far objects is reduced.

As above indicated, considerable variation from the particular examples above described is possible without departing from the spirit of the invention as expressed in the appended claims.

What I claim as my invention and desire to secure by Letters Patent is:

1. In combination with a conventional photographic objective, a depth increasing balancing assembly including: a plurality of annular lenses having non-parallel, spherical optical surfaces, said lenses being coaxially positioned in front of said conventional objective, at least one of said annular lenses having an external diameter equal to that of said conventional objective and at least one other of said annular lenses having an external diameter greater than the internal diameter of said first annular lens and less than the diameter of said conventional objective and said second annular lens having an internal diameter less than that of said first annular lens whereby the cone of light through said combination is effected in a central zone by said conventional objective alone, in an outwardly adjacent zone by said second annular lens and said objective, in a next outwardly adjacent zone by both said annular lenses and said objective, and in a peripheral zone by said first annular lens and said objective.

2. The construction of claim 1 further characterized in that said second annular lens is in contact with said first annular lens with a portion of said second annular lens extending within the central opening of said first annular lens.

3. In combination with a conventional photographic objective, a depth-increasing balancing assembly including: an annular lens having a convex spherical optical surface and an effective external diameter substantially less than that of said conventional objective, said annular lens being in operative coaxial alignment with said objective to thereby overlie a zone of said objective and leave unaffected by said lens a peripheral zone of said objective and a central effective area thereof for focusing far objects on a focal plane, said balancing assembly having a focal length approximating the distance to a near object to be photographed, said focal plane of said objective and said near object constituting conjugate foci as to light passing therebetween and through both said balancing assembly and said objective, whereby both said near and far objects are focused on said focal plane.

4. In combination with a conventional photographic objective, a depth increasing balancing assembly including: an annular lens having a convex spherical optical surface and an effective external diameter substantially less than that of said conventional objective, and means mounting said annular lens in front of said objective in operative coaxial alignment therewith to thereby overlie a zone of said objective and leave unaffected by said lens a peripheral zone of said objective and a central effective area thereof for focusing far objects on a focal plane, said balancing assembly having a refractive power such that said focal plane of said objective and a near object to be photographed constitute conjugate foci as to light passing therebetween and through both said balancing assembly and said objective, whereby both said near and far objects are focused on said focal plane.

5. In combination with a conventional photographic objective, a depth-increasing balancing assembly including: a pair of substantially identical annular lenses each having convex spherical optical surfaces and each having an effective external diameter less than that of said conventional objective, said annular lenses being in operative coaxial alignment with said conventional objective to thereby overlie a zone of said objective and leave unaffected by said pair of lenses a peripheral zone of said objective and a central effective area thereof for focusing far objects on a focal plane, said balancing assembly having an effective focal length approximating the distance to a near object to be photographed, said focal plane of said objective and said near object constituting conjugate foci as to light passing therebetween and through both said balancing assembly and said objective, whereby both said near and far objects are focused on said focal plane.

6. In combination with a conventional photographic objective, a depth-increasing balancing assembly including: a pair of substantially identical annular lenses each having convex spherical optical surfaces and each having an effective external diameter less than that of said objective, and means mounting said pair of lenses in front of said objective in operative coaxial alignment therewith to thereby overlie a zone of said objective and leave unaffected by said pair of lenses a peripheral zone of said objective and a central effective area thereof for focusing far objects on a focal plane, said balancing assembly having a refractive power such that said focal plane of said objective and a near object to be photographed constitute conjugate foci as to light passing therebetween and through both said balancing assembly and said objective, whereby both said near and far objects are focused on said focal plane.

7. In combination with a conventional photographic objective, a depth-increasing balancing assembly including: a pair of substantially identical double convex annular lenses having effective external diameters less than that of said conventional objective, and means mounting said pair of lenses in front of said objective in operative coaxial alignment therewith to thereby overlie a zone of said objective and leave unaffected by said pair of lenses a peripheral zone of said objective and a central effective area thereof for focusing far objects on a focal plane, said balancing assembly having an effective focal length approximating the distance to a near object to be photographed, said focal plane of said objective and said near object constituting conjugate foci as to light passing therebetween and through both said balancing assembly and said objective, whereby both said near and far objects are focused on said focal plane.

8. In combination with a conventional photographic objective, a depth-increasing balancing assembly including: an annular double convex lens having an effective external diameter less than that of said objective, said annular lens being positioned in front of said objective in operative coaxial alignment therewith to thereby overlie a zone of said objective and leave unaffected by said lens a peripheral zone of said objective and a central effective area thereof for focusing far objects on a focal plane, said balancing assembly having a refractive power such that said focal plane of said objective and a near object to be photographed constitute conjugate foci as to light passing therebetween and through both said balancing assembly and said objective, whereby both said near and far objects are focused on said focal plane.

STEPHEN E. GARUTSO.

REFERENCES CITED

The following references are of record in the file of this patent:

UNITED STATES PATENTS

| Number | Name | Date |
|---|---|---|
| 1,154,232 | Byron | Sept. 21, 1915 |
| 1,169,731 | Mengel | Jan. 25, 1916 |
| 1,627,892 | Frederick | May 10, 1927 |
| 1,979,159 | Howser | Oct. 30, 1934 |
| 2,004,806 | Ellestad | June 11, 1935 |

FOREIGN PATENTS

| Number | Country | Date |
|---|---|---|
| 193,969 | Great Britain | Mar. 2, 1923 |
| 335,696 | Great Britain | Oct. 2, 1930 |
| 373,755 | Germany | Apr. 16, 1923 |